United States Patent
Hein et al.

(10) Patent No.: US 8,874,261 B2
(45) Date of Patent: Oct. 28, 2014

(54) METHOD AND SYSTEM FOR CONTROLLING A MOBILE ROBOT

(75) Inventors: Thomas Kent Hein, Moline, IL (US); Karl-Heinz O. Mertins, Urbandale, IA (US); Daniel W. Mairet, Bettendorf, IA (US)

(73) Assignee: Deere & Company, Moline, IL (US)

( * ) Notice: Subject to any disclaimer, the term of this patent is extended or adjusted under 35 U.S.C. 154(b) by 2125 days.

(21) Appl. No.: 11/869,148

(22) Filed: Oct. 9, 2007

(65) Prior Publication Data

US 2009/0030551 A1 Jan. 29, 2009

Related U.S. Application Data (60) Provisional application No. 60/951,890, filed on Jul. 25, 2007.

(51) Int. Cl.
*G06F 19/00* (2011.01)
*G06F 15/00* (2006.01)

(52) U.S. Cl.
USPC ........... 700/245; 700/249; 700/264; 700/253; 702/181; 709/223

(58) Field of Classification Search
USPC .................. 700/245, 249, 264, 253; 702/181; 709/223, 229
See application file for complete search history.

(56) References Cited

U.S. PATENT DOCUMENTS

| 5,202,661 | A | 4/1993 | Everett, Jr. et al. |
|---|---|---|---|
| 5,576,947 | A | 11/1996 | Wienkop |
| 6,879,878 | B2 | 4/2005 | Glenn et al. |
| 7,069,111 | B2 | 6/2006 | Glenn et al. |
| 2005/0234679 | A1 * | 10/2005 | Karlsson ........................ 702/181 |
| 2006/0079998 | A1 | 4/2006 | Yoshikawa et al. |
| 2006/0095158 | A1 | 5/2006 | Lee et al. |
| 2007/0090973 | A1 * | 4/2007 | Karlsson et al. .......... 340/995.22 |
| 2007/0199108 | A1 * | 8/2007 | Angle et al. ..................... 901/17 |

FOREIGN PATENT DOCUMENTS

| JP | 5-159187 | 6/1993 |
|---|---|---|
| JP | 6-202732 | 7/1994 |
| JP | 7-164374 | 6/1995 |
| JP | 2003-256042 | 9/2003 |
| JP | 2003-288118 | 10/2003 |
| JP | 2006-318173 | 11/2006 |
| WO | 2005018883 | 3/2005 |

* cited by examiner

*Primary Examiner* — Ronnie Mancho (57) ABSTRACT

A method and a system for operating a mobile robot comprise a range finder for collecting range data of one or more objects in an environment around the robot. A discriminator identifies uniquely identifiable ones of the objects as navigation landmarks. A data storage device stores a reference map of the navigation landmarks based on the collected range data. A data processor establishes a list or sequence of way points for the robot to visit. Each way point is defined with reference to one or more landmarks. A reader reads an optical message at or near one or more way points. A task manager manages a task based on the read optical message.

17 Claims, 9 Drawing Sheets

FIG. 9

METHOD AND SYSTEM FOR CONTROLLING A MOBILE ROBOT

This document (including all drawings) claims priority based on U.S. provisional application Ser. No. 60/951,890, filed Jul. 25, 2007 under 35 U.S.C. 119(e).

FIELD OF THE INVENTION

This invention relates to a method and system for controlling a mobile robot.

BACKGROUND OF THE INVENTION

Mobile robots are sometimes designed to accomplish specific tasks or a predetermined mission. Specialization allows robots to tackle specific tasks or predetermined mission in a predictable and reliable fashion. However, modification of the tasks or mission may require a computer programmer or a skilled technician. Accordingly, there is a need for a method and system for controlling a mobile robot that supports modification of its tasks or mission by unskilled workers or persons.

SUMMARY OF THE INVENTION

A method and a system for operating a mobile robot comprise a range finder for collecting range data of objects in an environment around the robot. A discriminator identifies uniquely identifiable ones of the objects as navigation landmarks. A data storage device stores a reference map of the navigation landmarks based on the collected range data. A data processor establishes a list or sequence of way points for the robot to visit. Each way point is defined with reference to one or more landmarks. A reader reads an optical message at or near one or more way points. A task manager manages a task based on the read optical message.

DESCRIPTION OF THE PREFERRED EMBODIMENT

Figure 1:
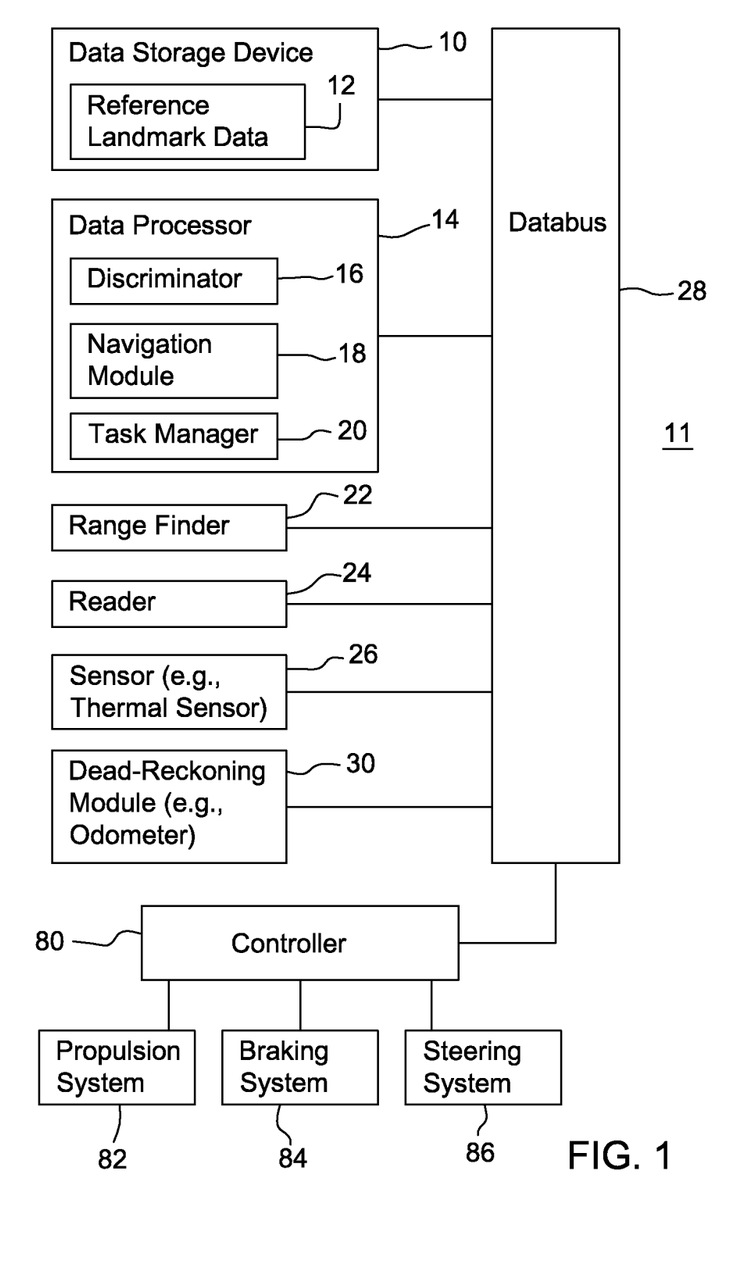
FIG. 1 is a block diagram of a first embodiment of a system for controlling a mobile robot.

In accordance with one embodiment, FIG. 1 illustrates a control system 11 for controlling a mobile robot. The control system 11 comprises a range finder 22, a reader 24, a sensor 26, a dead reckoning module 30, and a data storage device 10 that communicate with a data processor 14 via a databus 28 or otherwise.

A range finder 22 may comprise any device that measures a distance or range between the range finder 22 and an object (e.g., a landmark). The range finder 22 transmits an electromagnetic signal (e.g., a pulse) toward an object at a transmission time, receives a reflection (e.g., a reflected pulse) of the electromagnetic signal from the object at a reception time, and measures a propagation time between the transmission time and the reflection time to estimate the distance between the range finder 22 and the object. The range finder 22 may comprise a laser range finder 22, a scanning laser, or another device for determining the range with respect to the range finder 22. The range may be expressed in terms of distance, distance and angular displacement, object coordinates with respect to the range finder 22, or three dimensional angular displacements with respect to the range finder 22. The range finder 22 collects range data of objects in an environment around the robot.

A reader 24 may comprise an optical reader 24, a radio frequency reader 24, or another reader 24 for reading optical tags, radio frequency tags, or both. A radio frequency tag includes radio frequency identifiers or RFID's. The reader 24 may read an optical message or a radio frequency identifier (RFID) at or near one or more way points, for example. As used herein, an optical message or optical tag means a bar code, a uniform product code, or an image, pattern or message on a display (e.g., a liquid crystal or plasma display).

A way point may comprise any point or coordinates along a path plan of the robot. Typically, the robot may visit or stop at a way point to execute a task (e.g., collect data, monitor the environment or otherwise). A way point position may be defined with reference to one or more navigation landmarks. For example, the way point position may be defined as a distance and angular bearing from a corresponding landmark. The way point position may be expressed in polar coordinates, in Cartesian coordinates, or as vectors.

A sensor 26 may comprise one or more of the following: a light level detector, a photometer, a carbon monoxide level detector, a carbon dioxide level detector, an oxygen level detector, an natural gas level detector, an acetylene level detector, an ionizing radiation level detector, a thermal sensor, a smoke detector, a fire detector, a heating failure detector, a water detector (e.g., for detecting water on the floor), a imaging unit, a camera, a video camera, a charge-coupled device, a motion detector, an infrared camera, a visible light camera, and a docking station detector (e.g., for detecting a presence or proximity of a docking station for recharging or refueling the robot.

In one embodiment, a camera or imaging unit may include an optical or digital zoom lens for the camera or imaging unit. In another embodiment, the camera or imaging unit comprises at least one of pan, tilt and zoom features. The camera may collect one or more images of an environment around the robot. For example, the camera may facilitate a determination (e.g., by a data processor 14 or by a user at a user interface console 38 of FIG. 9) of whether a door is open or closed by verifying the presence of an optical pattern on the door at a particular corresponding location on the door and consistent with the geographic coordinates or location (e.g., a map location) of the door on the building.

In one configuration, a thermal sensor senses thermal variation in the air within a room or another confined space. In one example, the sensor 26 may comprise a thermistor that changes resistance with temperature in accordance with a known relationship. In another example, the sensor 26 may comprise an ultrasonic sensor that includes a transmitter for transmitting an ultrasonic signal (e.g., a pulse) at a transmission time, a receiver for receiving an echo or reflection of the ultrasonic signal from one or more walls or partitions within a room at a reception time and a timer for measuring the elapsed time between the transmission time and reception time of the ultrasonic signal. The ultrasonic sensor determines a change in air temperature based on a variation in the elapsed time. The elapsed time may sometimes be referred to as time of flight or propagation time for an ultrasonic signal. The ultrasonic signal may have an omni-directional or directional radiation pattern with respect to the sensor. A directional radiation pattern may be defined as an ultrasonic signal that predominately falls within an angular range, such as a −3 dB or half-power bandwidth. If the indoor temperature is different from the outdoor temperature, the ultrasonic sensor detects a spatial temperature profile (e.g., a temperature gradient or series of temperature versus angular displacement readings) for an open window, an open door, a closed window and a closed door for security applications.

A dead-reckoning module 30 comprises an odometer, the combination of an odometer and a steering angle sensor, or another device for measuring the displacement of the mobile robot, or displacement and steering angle of the robot. For example, the dead-reckoning module 30 may comprise a device for measuring the number of rotations of a wheel (e.g., ground engaging wheel) associated with the mobile robot and converting the measurement into a traveled distance or displacement of the mobile robot. A steering angle sensor may comprise an electromechanical sensor, an electro-hydraulic sensor, a potentiometer, a magnetic sensor, a magneto-restrictive sensor, a piezoelectric sensor, a piezoresistive sensor, or any other suitable sensor. The dead-reckoning device, the range finder 22, or both may both provide location data or position data to the data processor 14 or the navigation module 18.

The data processor 14 comprises the following functional modules: a discriminator 16, navigation module 18, and a task manager 20. The discriminator 16 identifies uniquely identifiable ones of the objects as navigation landmarks. In one example, the discriminator 16 or the reader facilitates identification or verification of landmarks (or candidate landmarks) by reading particular optical and radio frequency tags associated with (or placed on) corresponding landmarks. In another example, the discriminator 16 may use color differentiation to identify pixels or clusters of pixels of particular colors, particular hues, particular shades, particular color ranges, or particular color space definitions (e.g., red-green-blue (RGB) color space definition, or a hue, saturation value (HSV) color space definition) as corresponding landmarks. In yet another example, the discriminator 16 may use pattern matching to match a shape, and or dimensions to a reference shape, or reference dimensions associated with a corresponding particular landmark. In another example, the navigation module 18 manages at least one of the creation, storing, retrieval, and updating of map for navigation of the mobile robot. Further, the navigation module 18 regularly (e.g., periodically) estimates the present location of the vehicle by using the range finder 22 to provide a range and a corresponding angular bearing to a landmark (e.g., a tag). The task manager 20 manages a task based on a read optical message read from a tag (e.g., at, near or around a way point or a land mark). The task may be assigned to a particular landmark or way point, for example.

If the range finder 22 is within range of an observable or detectable landmark, the navigation module 18 may first determine the range data (e.g., range or distance and corresponding angular bearing) for the object; second, identify the landmark or verify its authenticity (e.g., by reading a tag), and third, retrieve the coordinates associated with the identified landmark, and fourth, determine the coordinates or position of the mobile vehicle based on the landmark position and the range and angular position associated therewith. If the mobile robot is configured for indoor use, the dead-reckoning module 30 may be used instead of a Global Positioning System (GPS) receiver because the GPS receiver within a building may not receive a reliable signal of sufficient signal strength, adequate signal quality or sufficient low bit error rate from one or more satellites.

If the range finder 22 is not within range of an observable or detectable landmark, the data processor 14 or navigation module 18 may use the output of the dead-reckoning module 30 to estimate the position or location of the vehicle from the last known position or identified landmark. The dead reckoning module 30 records (a virtual data trail or path) between an origination position and a destination position over a given time period. The recorded trail or path may be time stamped and saved in the data storage device. A segment of the recorded trail or path or multiple recorded trails and paths may be accessed or read to estimate a current position of the robot from a last known position (e.g., within a desired degree of confidence). Accordingly, the dead-reckoning module 30 provides interim position information that is used in any of the following conditions: (1) where the range finder 22 of the mobile robot observe or detect a candidate landmark, (2) where the discriminator 16 cannot identify a landmark as unique or can not verify a candidate landmark qualifies as a confirmed or actual identifiable landmark, (3) where a reader 24 or mobile robot is out-of-range (e.g., reception or transmission of an optical, terrestrial, satellite or electromagnetic signal) of any identifiable message (e.g., bar code or RF identifier) or a modulated or encoded signal that might otherwise be used to confirm a way point identity or location, or a landmark identity or location, or (4) where the range finder 22 or mobile robot is not within line-of-sight of any identifiable landmark. Once the range finder 22 is able to determine or reacquire its location with respect to any identifiable landmark or last known position, the dead-reckoning location data may be aligned or reset to be coextensive with the range-finder based location data.

A data storage device 10 may comprise a magnetic storage device, an optical storage device, electronic memory, nonvolatile electronic memory, a hard-disk drive, a tape drive, or another device for storing digital or analog data. A data storage device 10 is capable of storing a reference map of reference landmark data. The data storage device 10 stores reference landmark data 12 based on collected range data or a survey of an environment or work area around the robot, for example. In one embodiment, each reference landmark data 12 may be associated with one or more of the following items: (1) a particular or unique identification tag (e.g., an RF ID tag, a bar code, or an optical tag) having a known code, (2) particular coordinates assigned to the reference landmark (e.g., relative to an origin or reference point), (3) particular coordinates assigned to one or more way points, (4) a sequence or list of way points visited, (5) a sequence or list of way points visited and corresponding time stamps of the visit time and/or date, (6) a sequence or list of way points to be visited, (7) tasks associated with corresponding landmarks or way points, (8) incomplete tasks associated with corresponding landmarks or way points, (9) completed tasks associated with corresponding landmarks or way points, and (10) a mission associated with corresponding landmarks or way points.

In general, the data processor 14 comprises a controller, a microcontroller, a programmable logic array, a microprocessor, a logic circuit, or another device that provides data processing for the mobile robot. A data processor 14 establishes a list or sequence of way points for the robot to visit. Each way point is defined with reference to one or more landmarks.

The robot comprises the combination of a control system 11, a controller 80, a propulsion system 82, a braking system 84, and a steering system 86. The controller 80 communicates to the propulsion system 82, the braking system 84, and the steering system 86 via one or more data paths. Each line interconnecting the controller 80 with another component of FIG. 1 may comprise a physical data path, a logical data path, or both.

The controller 80 communicates with the data processor 14 via the databus 28 or directly to the data processor 14. The data processor 14 may generate or provide a list or sequence of way points or a path plan to the controller 80. The controller 80 generates control data for the propulsion system 82, the steering system 84, and the braking system 84 to follow a path or reach each way point in the proper sequence, for example.

If the propulsion system 82 comprises an electric motor or drive motor, the controller 80 comprises a motor controller, an inverter, a chopper circuit, a variable voltage supply, a variable current supply, a pulse width modulated power supply, or another controller for varying the power, amplitude, frequency or input signal to the electric motor or drive motor to control its speed, torque or operation. If the propulsion system 82 comprises an internal combustion engine or a hybrid with an internal combustion engine, the controller 80 comprises an engine controller.

Figure 2:
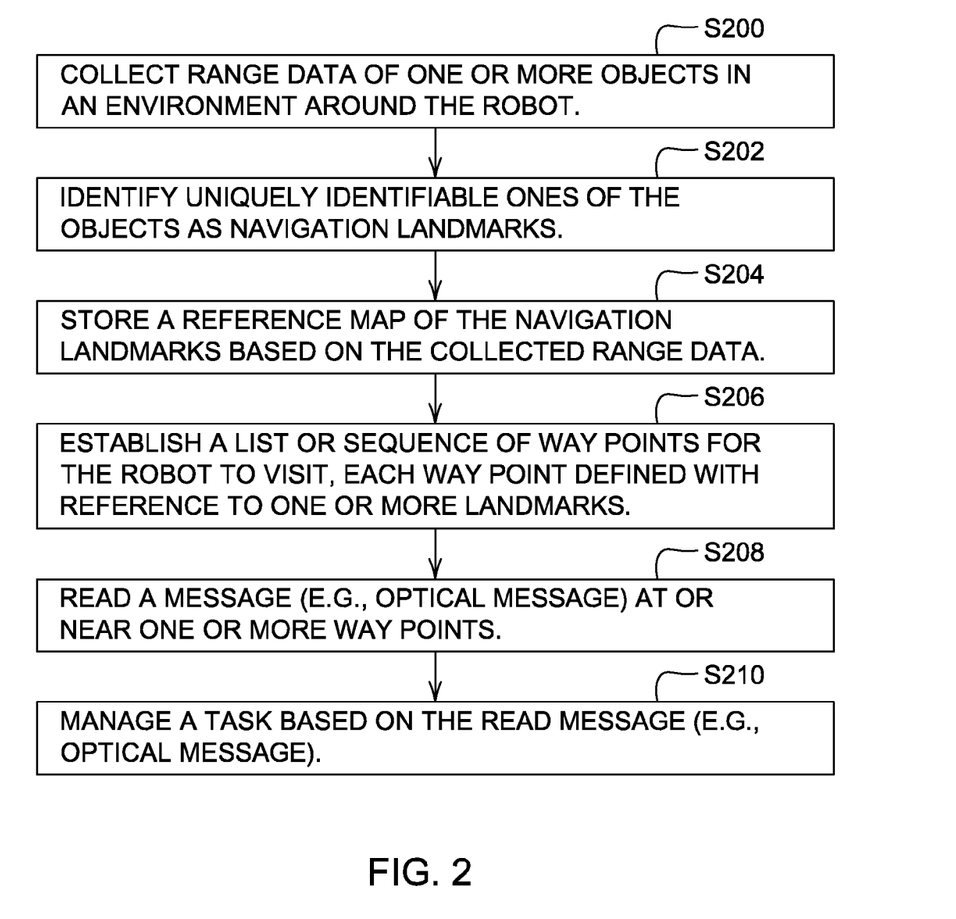
FIG. 2 is a flow chart of a first embodiment of a method for controlling a mobile robot.

FIG. 2 illustrates a method for controlling a mobile robot. The method of FIG. 2 begins in step S200.

In step S200, a ranger finder 22 collects range data of one or more objects in an environment around a robot. The range data may comprise one or more of the following items: (1) a distance and angular bearing, (2) coordinates (e.g., absolute or relative) of the object or landmark, (3) coordinates of the object with respect to an observational reference frame (e.g., Cartesian coordinates or polar coordinates) with an origin coextensive with at least one of the range finder 22, the sensor 26, and the robot.

In step S202, a discriminator 16 or data processor 14 identifies uniquely identifiable ones of the objects as navigation landmarks (e.g., actual navigation landmarks). For example, the discriminator 16 of data processor 14 may evaluate data collected by at least one of the reader 24 and the sensor 26 to identify an object as a landmark or a candidate navigation landmark as a verified or actual navigation landmark. The discriminator 16 or data processor 14 may retrieve or access reference landmark data 12 or definitions of navigation landmarks in the data storage device 10. In one embodiment, the reference landmark data may comprise reference optical data, reference color data, reference image data, reference object shape data, reference object boundary data, or other reference sensor data for comparison to sensor data collected by the sensor 26. In another embodiment, the reference landmark data comprises bar code labels, radio frequency identifiers, radio frequency tags, optical tags, universal product code tags, or the like for comparison to reader data collected by the reader 24.

The discriminator 16 or data processor may identify candidate navigation landmarks or objects as actual navigation landmarks in accordance with various techniques that may be applied individually, or cumulatively. Under a first technique, the discriminator 16 or the reader facilitates identification or verification of candidate landmarks (as actual landmarks) by reading particular optical and radio frequency tags associated with (or placed on) corresponding landmarks.

Under a second technique, the discriminator 16 may use color differentiation to identify pixels or clusters of pixels of particular colors, particular hues, particular shades, particular color ranges, or particular color space definitions (e.g., red-green-blue (RGB) color space definition, or a hue, saturation value (HSV) color space definition) as corresponding landmarks. Reference colors, hues, shades, color ranges or reference color space definitions are stored in the data storage device 10 for comparison and matching to observed colors, hues, shades, color ranges, or observed color space definitions in one or more collected images collected by sensor 26.

Under a third technique, the discriminator 16 may use pattern matching to match a shape, and or dimensions to a reference shape, outline of an object, border of an object, or reference dimensions associated with a corresponding particular landmark. The reference shapes or dimensions are stored in the data storage device 10 for comparison and matching to observed dimensions, observed reference shapes, observed outlines and observed borders of objects.

In step S204, a data storage device 10 or control system 11 stores a reference map of the navigation landmarks based on the collected range data. For example, the reference map may comprise coordinates of the corresponding navigation landmarks, or groupings of coordinates and corresponding navigation landmark identifiers. The reference map may be stored in the data storage device 10, which is accessed to facilitate guidance of the vehicle from one way point to another, or from a starting point of the robot to a destination point of the robot. The reference map may be collected during a survey of a work area in which the robot is intended to operate, or the control system 11 may collect, create, update or augment the reference map by operation in a particular work area.

In step S206, a data processor 14 or navigation module 18 establishes a list or sequence of way points for the robot to visit. Each way point is defined with reference to one or more landmarks. For example, each way point is defined with reference to coordinates of one or more landmarks and range data. The range finder 22 may provide range data (e.g., in range and corresponding angular bearing) for each identifiable or verified landmark. The angular bearing may be expressed as tilt, roll and pitch.

In step S208, a reader 24 reads a message (e.g., an optical message) at or near one or more way points. For example, the reader 24 reads an optical tag, a bar code tag, a bar code symbol, a radio frequency identifier, a radio frequency tag, or the like around, at or near a way point. Each optical tag, a bar code tag, a bar code symbol, a radio frequency identifier, a radio frequency tag is associated with a corresponding message or code. In turn, each message or code may comprise instructions for the data processor 14 to execute a task, a mission, or a sequence of tasks. The code is defined or selected by a user via a user interface, or provided by a technical or service provider to the user.

In accordance with one illustrative example for carrying out step S208, a technician, security guard or other user of the control system 11 or robot may advantageously change the task or mission by changing, replacing, or reprogramming an optical tag, a bar code tag, a bar code symbol, a radio frequency identifier, a radio frequency tag around or near one or more way points. Because no technical programming changes are necessary to the control system 11 or data processor 14 to change the behavior of the robot, or the tasks or missions executed by the robot via the control system 11, any task or mission may be changed readily by changing, replacing or reprogramming of an optical tag, a bar code tag, a bar code symbol, a radio frequency identifier, a radio frequency tag around or near one or more way points.

Alternately, the control system 11 or data processor 14 may be reprogrammed by assigning new tasks, missions to corresponding codes or messages associated with an optical tag, a bar code tag, a bar code symbol, a radio frequency identifier, a radio frequency tag.

In step S210, a task manager 20 manages a task or a mission based on the read message (e.g., read optical message). For example, the task manager 20 may execute one or more tasks based on the decoding of reading of the read message associated with the optical tag, a bar code tag, a bar code symbol, a radio frequency identifier, a radio frequency tag. The task manager 20 may store or archive completed tasks or missions with corresponding time stamps to verify completion of such tasks or missions for a user. As the robot carries the reader 24 along a route or path, the task manager 20 may execute successive tasks along a route after previous tasks are completed, for instance.

Illustrative tasks for the robot may comprise one or more of the following: (1) visit one or more stations or points along a designated path or planned route, (2) take a sensor reading, (3) generate or transmit an alert if the sensor reading falls outside a pre-defined acceptable range, exceeds an upper limit, or falls below a lower limit, (4) take safety or security measures, (5) activate a switch, (6) determine whether a door or window or other building portion is open to the outdoors, and (7) determine whether a safety or security violation has occurred. A mission may comprise one or more tasks that are executed in a certain sequence or with the application of certain logical constraints or rules. Rules may be expressed as if-then statements, conditional events or otherwise.

Figure 3:
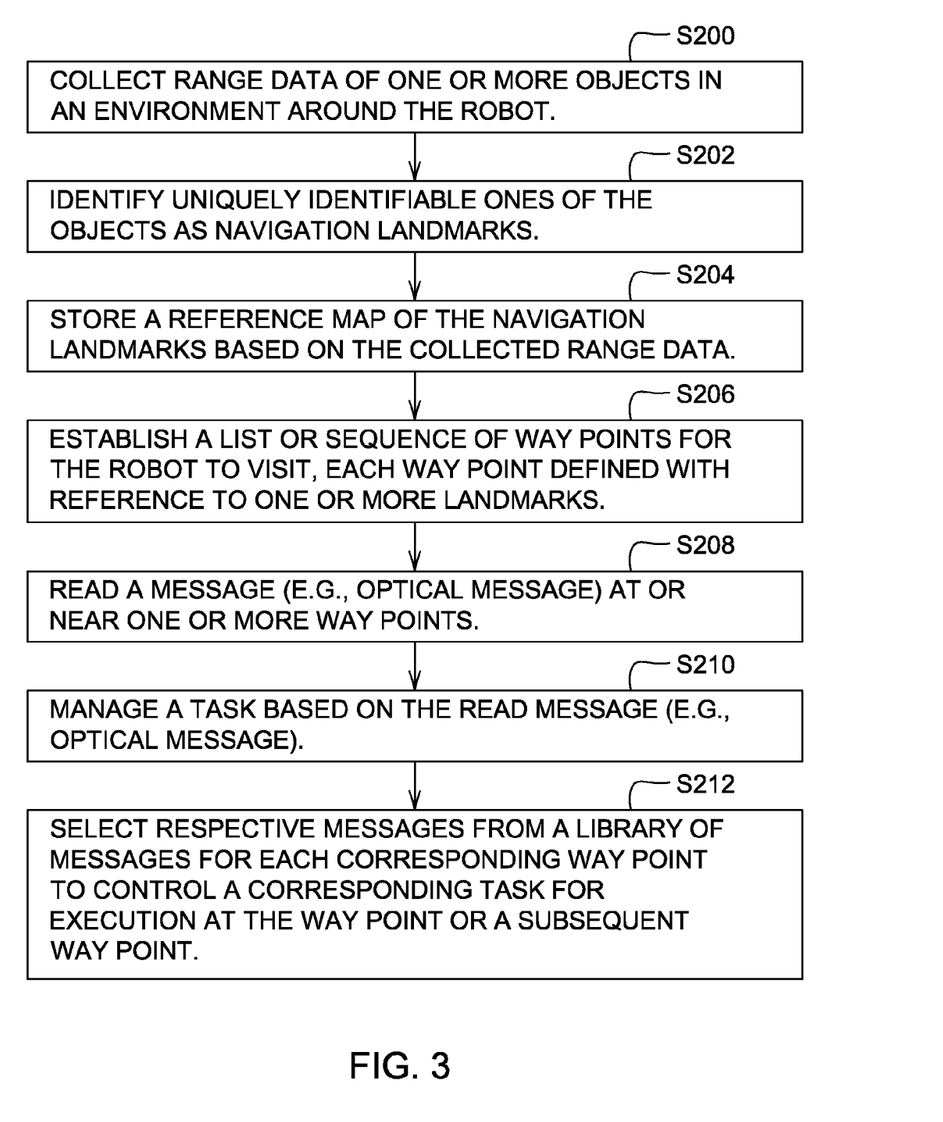
FIG. 3 is a flow chart of a second embodiment of a method for controlling a mobile robot.

The method of FIG. 3 is similar to the method of FIG. 2, except the method of FIG. 3 adds step S212. Like reference numbers in FIG. 2 and FIG. 3 indicate like steps or procedures.

Step S212 may follow step S210, which has already been described in conjunction with FIG. 2. In step S212, a data processor 14 or a selector selects a message for a tag from a library of messages for a corresponding way point to control a corresponding task for execution at the corresponding way point, a later way point, or a subsequent way point. In one example, each message may be associated with a corresponding code, which indicates a task or group of tasks to be performed by the data processor 14. Further, a particular task may be executed conditionally upon the control system 11 or robot reaching a certain respective way point. The control system 11 or data processor 14 determines that the certain respective way point is reached by estimating the position or coordinates of the robot or the control system 11 via at least one of the range finder 22, the reader 24, the sensor 26, and the dead-reckoning module 30.

Figure 4:
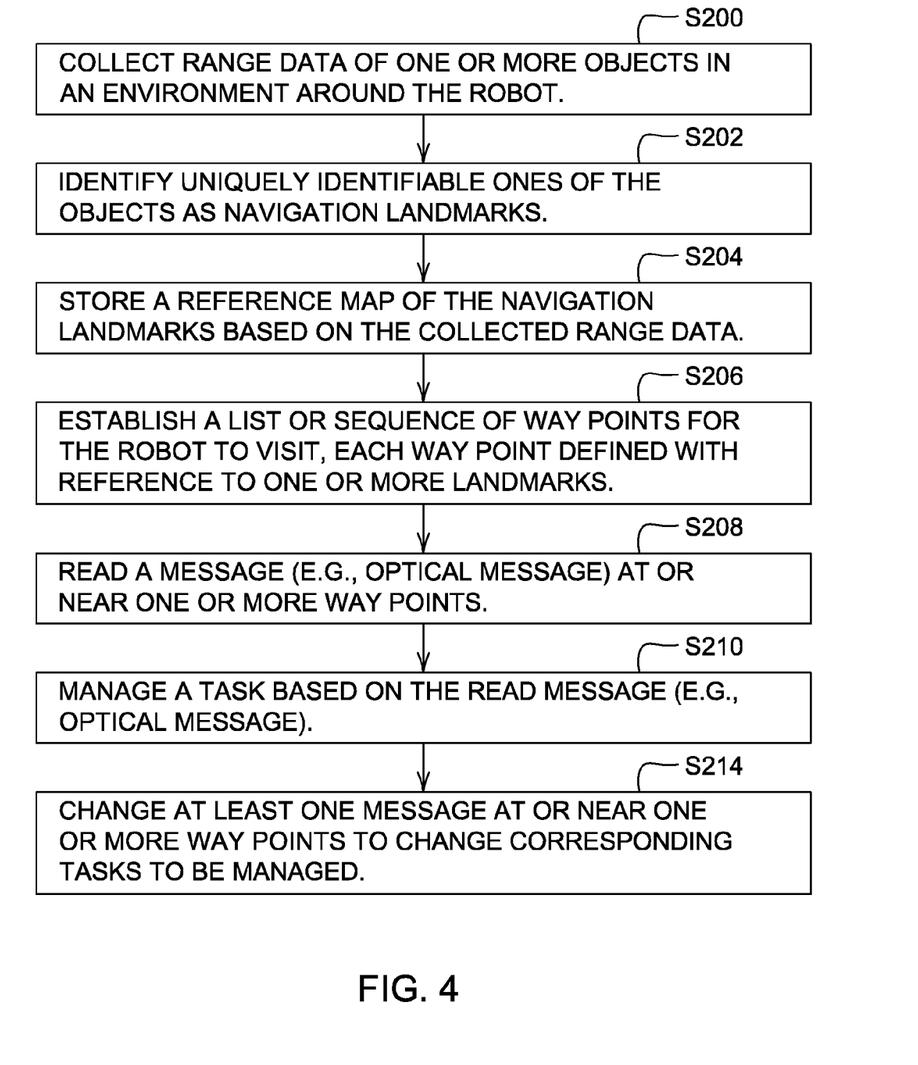
FIG. 4 is a flow chart of a third embodiment of a method for controlling a mobile robot.

The method of FIG. 4 is similar to the method of FIG. 2, except the method of FIG. 4 adds step S214. Like reference numbers in FIG. 2 and FIG. 4 indicate like steps or procedures.

Step S214 may follow step S210, which has already been described in conjunction with FIG. 4. In step S214, a user changes the messages (e.g., optical messages) at or near one or more way points to change corresponding tasks to be managed. Step S214 may be executed in accordance with various techniques that may be applied separately or cumulatively.

In accordance with a first technique, a user of the control system 11 or robot may advantageously change the task or mission by changing, replacing, or reprogramming an optical tag, a bar code tag, a bar code symbol, a radio frequency identifier, a radio frequency tag around or near one or more way points.

In accordance with a second technique, a user of the control system 11 or robot may advantageously change the task or mission by activating, deactivating, modifying, changing, replacing, or reprogramming a code or message associated with an optical tag, a bar code tag, a bar code symbol, a radio frequency identifier, a radio frequency tag around or near one or more way points.

Accordingly, because no technical programming changes are necessary to the control system 11 or data processor 14 to change the behavior of the robot, or the tasks or missions executed by the robot via the control system 11, any task or mission may be changed readily by activating, deactivating, modifying, changing, replacing or reprogramming of an optical tag, a bar code tag, a bar code symbol, a radio frequency identifier, a radio frequency tag.

Figure 5:
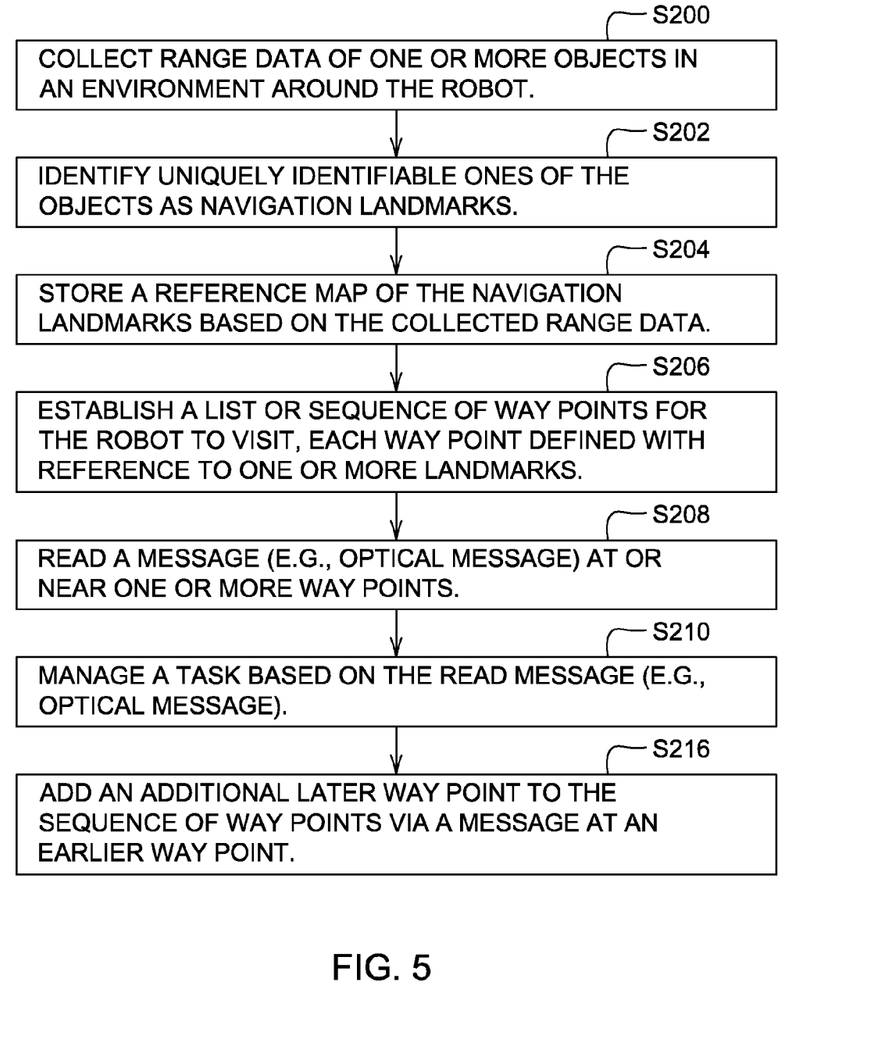
FIG. 5 is a flow chart of a fourth embodiment of a method for controlling a mobile robot.

The method of FIG. 5 is similar to the method of FIG. 2, except the method of FIG. 5 adds step S216. Like reference numbers in FIG. 2 and FIG. 5 indicate like steps or procedures. In step S216, a user adds an additional later way point to the sequence of way points via a message (e.g., an optical message) at an earlier way point. For example, a user may revise, add or activate an additional message or code on an optical tag, a bar code tag, a bar code symbol, a radio frequency identifier, a radio frequency tag at or near an earlier way point to direct the robot to visit or follow a path to the additional later way point. As used herein, the term later way point shall be synonymous with subsequent way point.

Step S216 may be executed in accordance with various techniques that may be applied separately or cumulatively.

In accordance with a first technique, a user of the control system 11 or robot may advantageously add a later way point to a planned path or route of the robot by activating, deactivating, changing, modifying, replacing, or reprogramming an optical tag, a bar code tag, a bar code symbol, a radio frequency identifier, a radio frequency tag around or near one or more earlier way points. An earlier way point is a way point that would be reached prior to a later way point if the robot follows a path plan.

In accordance with a second technique, a user of the control system 11 or robot may advantageously add a later way point to a planned path or route of the robot by activating, deactivating, changing, modifying, replacing, or reprogramming a code or message associated with an optical tag, a bar code tag, a bar code symbol, a radio frequency identifier, a radio frequency tag around or near one or more earlier way points.

Figure 6:
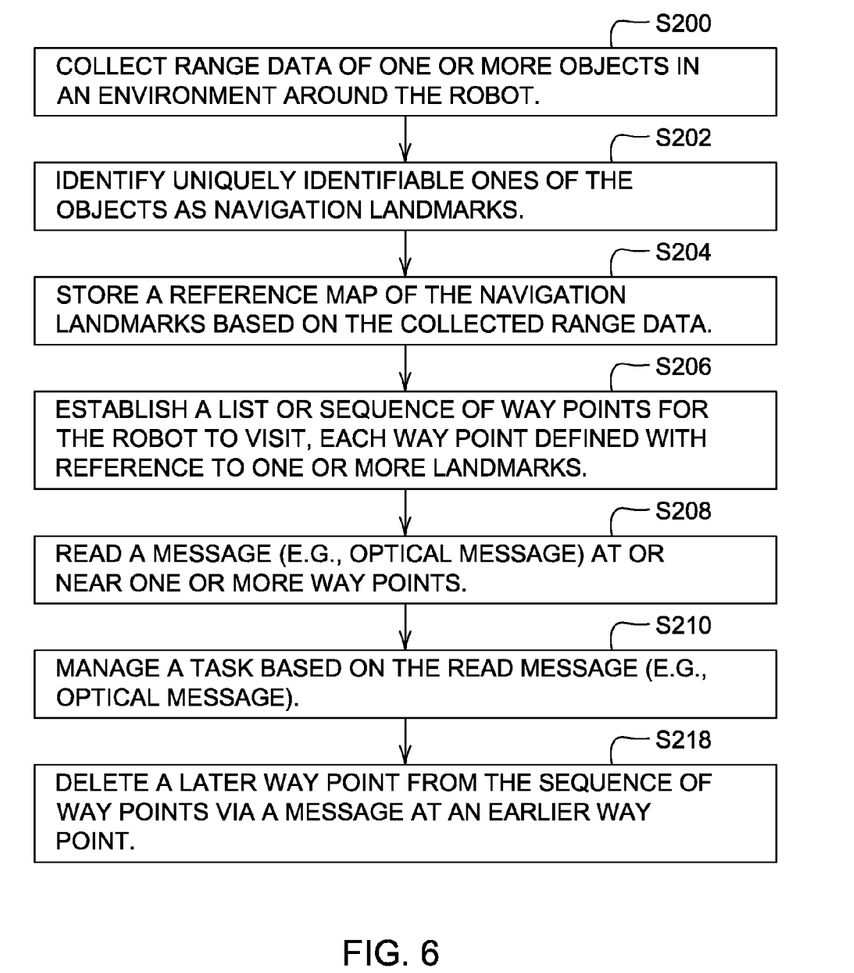
FIG. 6 is a flow chart of a fifth embodiment of a method for controlling a mobile robot.

The method of FIG. 6 is similar to the method of FIG. 2, except the method of FIG. 6 adds step S218. In step S218, a data processor 14 deletes a later way point from the sequence of way points via a message (e.g., an optical message).

Step S218 may be executed in accordance with various techniques that may be applied separately or cumulatively.

In accordance with a first technique, a user of the control system 11 or robot may advantageously delete a later way point from a planned path or route of the robot by activating, deactivating, changing, modifying, replacing, or reprogramming an optical tag, a bar code tag, a bar code symbol, a radio frequency identifier, a radio frequency tag around or near one or more earlier way points. The deletion of the way point may result in the formation of a new or revised path plan, or merely a command issued by the data processor 14 for the robot not to stop, take readings, or engage in one or more tasks at the deleted way point. An earlier way point is a way point that would be reached prior to a later way point if the robot follows a path plan.

In accordance with a second technique, a user of the control system 11 or robot may advantageously delete a later way point from a planned path or route of the robot by activating, deactivating, changing, modifying, replacing, or reprogramming a code or message associated with an optical tag, a bar code tag, a bar code symbol, a radio frequency identifier, a radio frequency tag around or near one or more earlier way points. The deletion of the way point may result in the formation of a new or revised path plan, or merely a command issued by the data processor 14 for the robot not to stop, take readings, or engage in one or more tasks at the deleted way point.

Figure 7:
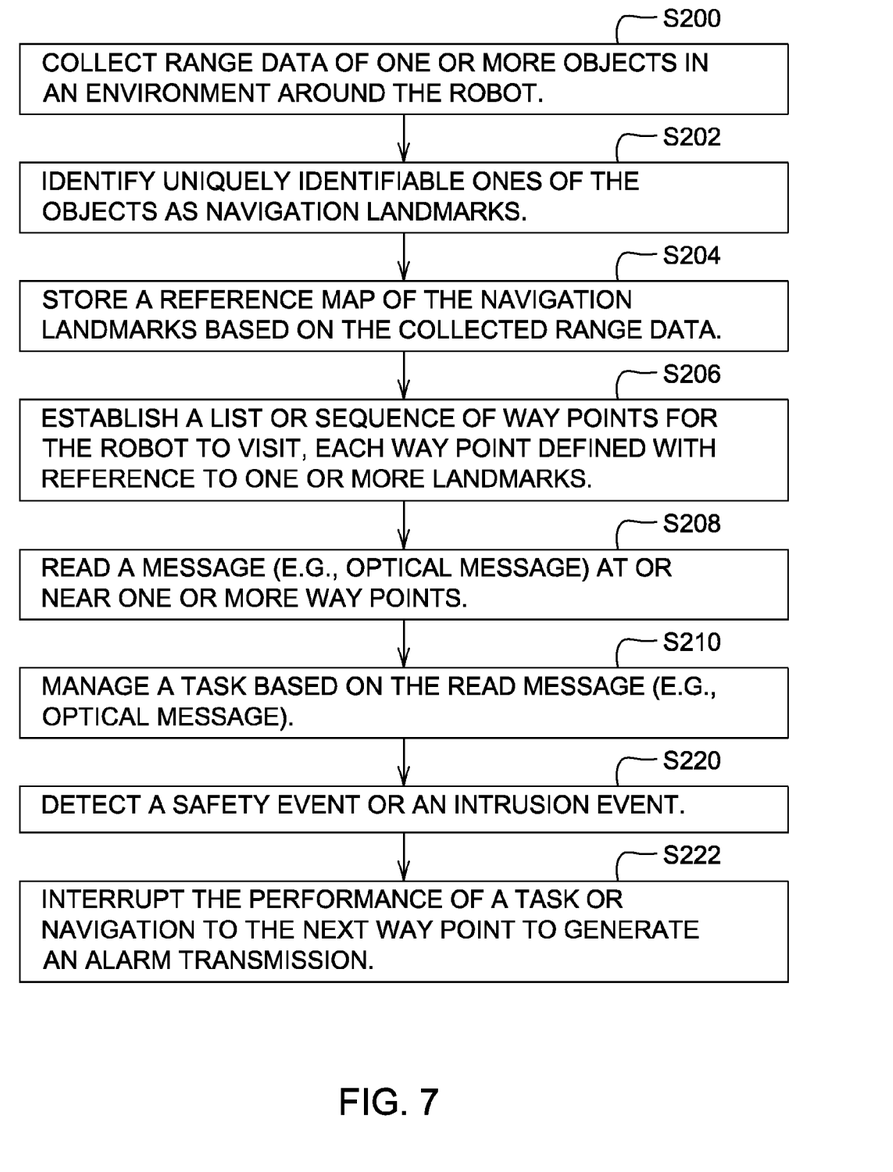
FIG. 7 is a flow chart of a sixth embodiment of a method for controlling a mobile robot.

The method of FIG. 7 is similar to the method of FIG. 2, except the method of FIG. 7 adds steps S220 and S222. Like steps or procedures are indicated by like reference numbers.

In step S220, the sensor 26 detects a safety event or an intrusion event. For example, a thermal sensor as sensor 26 detects whether or not a door or window is open within a room, which may indicate that an intrusion has occurred.

In step S222, the data processor 14 or task manager 20 interrupts the performance of a task or navigation to the next way point to generate an alarm transmission consistent with the safety event or the intrusion event. Step S222 may be carried out in accordance with various procedures that may be entered individually or collectively.

Under a first procedure, the task manager 20 may comprise an interrupter or a priority module that interrupts, pauses, or ceases performance of a task or navigation of the robot to transmit an alarm during an alarm duration; after the alarm duration expires the task manager 20 may resume or continue performance of the task or navigation that was interrupted, ceased or paused.

Under a second procedure, the robot or its sensor 26 may detect a particular thermal variation pattern or a particular air temperature gradient associated with an open door or open window as the intrusion event or security event. The data processor 14 may store a reference thermal variation pattern or a reference air temperature gradient in the data storage device 10 or elsewhere. If the observed thermal variation pattern detected by the sensor 26 substantially conforms to the reference thermal variation pattern for an open door or window, the data processor generates an intrusion event or security event. Similarly, if the observed air temperature gradient detected by the sensor 26 substantially conforms to the reference air temperature gradient, the data processor 14 generates an intrusion event or security event. A security system or a user may verify the intrusion event or security event by evaluation of other sensor data, for instance.

Figure 8:
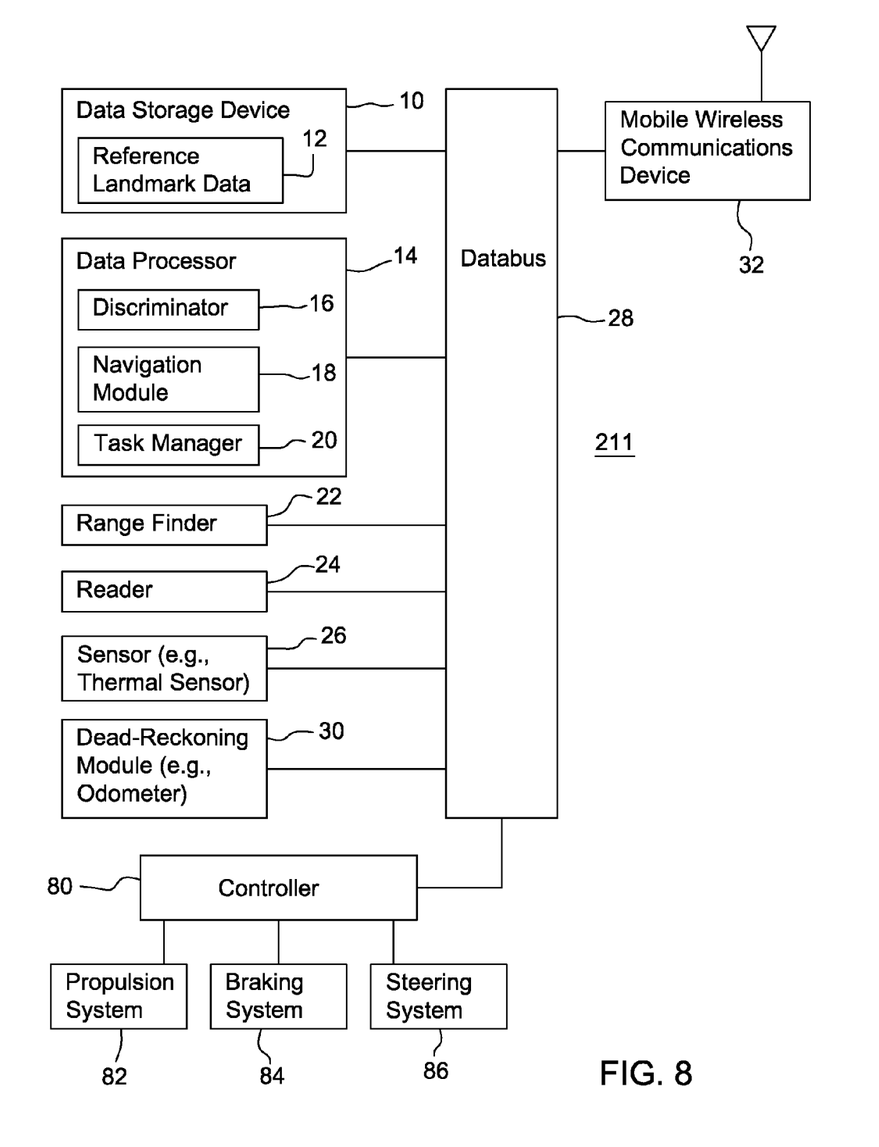
FIG. 8 is a block diagram of a second embodiment of a system for controlling a mobile robot.

The control system 211 of FIG. 8 is similar to that control system 11 of FIG. 1, except the control system 211 of FIG. 8 further comprises a mobile wireless communications device 32. Similarly, the robot of FIG. 8 comprises the combination of the control system 211, the controller 80, the propulsion system 82, the braking system 84, and the steering system 86. Like reference numbers in FIG. 1 and FIG. 8 indicate like elements.

As shown the mobile wireless communications device 32 is coupled to the databus 28. The mobile wireless communications device 32 may transmit an alarm, alarm data, a status message, status data, security data, or a preprogrammed or pre-recorded audio message to a security guard, a security service, a fire department, law enforcement, the police, or otherwise. For example, the mobile wireless communications device 32 may transmit a preprogrammed or pre-recorded audio message to a wireless communications network, a wireless base station, a cellular communications system, a trunking communications system, a repeater, or a public switched telephone network associated with any of the foregoing communication devices.

Figure 9:
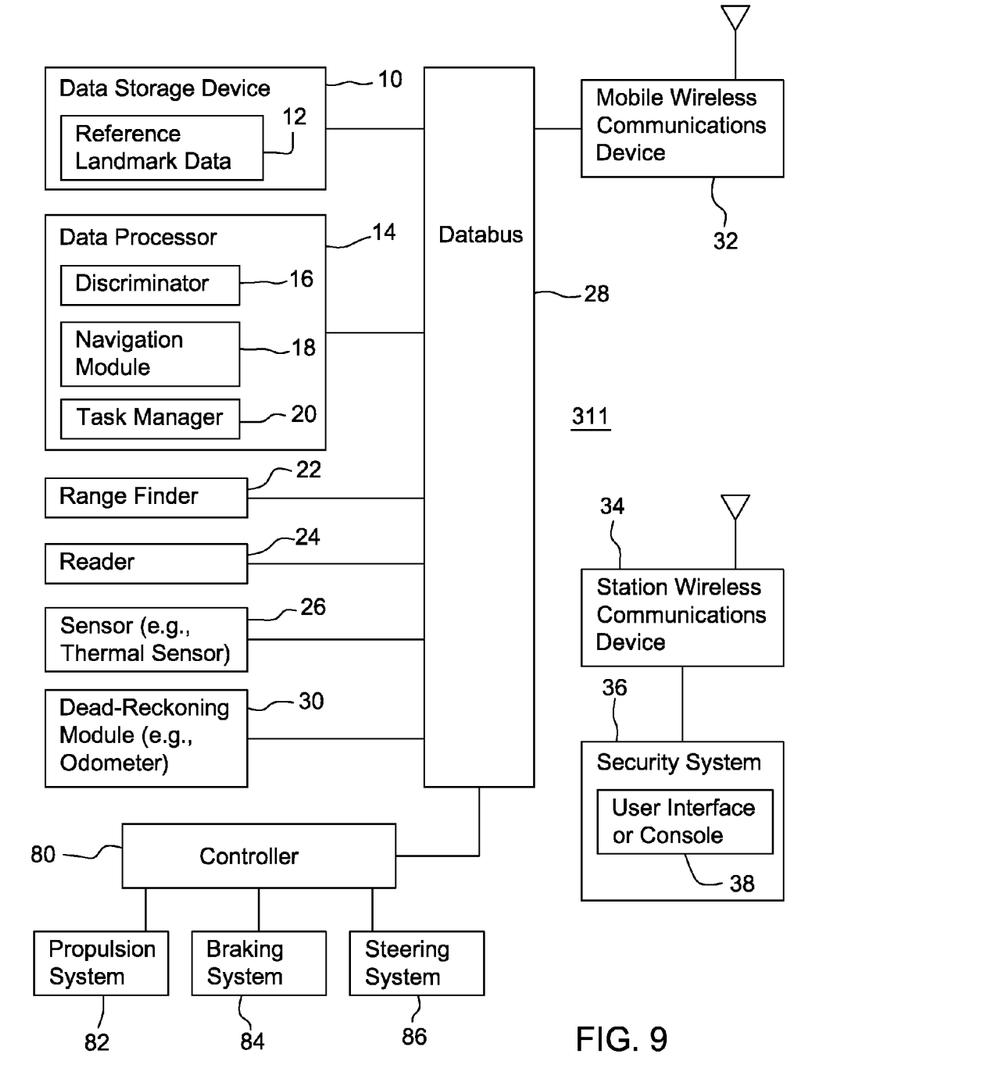
FIG. 9 is a block diagram of a third embodiment of a system for controlling a mobile robot.

The control system 311 of FIG. 9 is similar to the control system 11 of FIG. 1, except the control system 311 of FIG. 9 further comprises a mobile wireless communications device 32, a station wireless communications device 34, and a security system 36. Similarly, the robot of FIG. 9 comprises the combination of the control system 311, the controller 80, the propulsion system 82, the braking system 84, and the steering system 86. Like reference numbers in FIG. 1, FIG. 8 and FIG. 9 indicate like elements.

The security system 36 is coupled to the station wireless communications device 34. The security system 36 may receive image data, sensor data, range data, reader data, alarm data, status data, security data, audio recordings, alarms or messages from the mobile robot via an electromagnetic signal transmitted by the mobile wireless communications device 32 and received by the station wireless communications device 34.

The security system 36 comprises a security alarm system, a burglar alarm system, a fire alarm system, an emergency alarm system, or another device or system for monitoring the security of a facility, building, property or area. The security system 36 may have sensors (e.g., open door sensor, open window sensor, fire alarm sensor, smoke detector, motion detector) distributed throughout a facility, building, property or area that provide sensor data to the security system 36 where it is observed by a user or operator (e.g., security guard) or transmitted via a telecommunications network (e.g., the Internet, wireless or public switched telephone network) to a security center, a private security service, the fire department, the police department, public safety, or other otherwise. The security system may make a decision to generate an alarm or to generate a telephone message or a pager message based on an evaluation of sensor data, including any sensor data from the control system (11, 111 or 211). Although the security system 36 is typically coupled to a telecommunications network for the transmission of status messages, alarms, or alerts, the security system 36 may not be coupled to a telecommunications network, where the security system 36 is manned by an operator.

As shown in FIG. 9, the security system 36 comprises a user interface 38 or console that may be manned by a security guard or another person. For example, the user interface 38 may comprise any of the following items: a keyboard, a keypad, a switch, a group of switches, visual indicators (e.g., status lights or light emitting diodes), gauges, alarms, a speaker, a transducer, a microphone, a pointing device (e.g., an electronic mouse), and a display. The user interface 36 facilitates monitoring of the status, environment or position of the robot by viewing one or more images collected by the sensor 26 or other sensor data. The user interface 38 may display, present or provide audio, visual or other messages to a user. Further, the user interface 36 may support supervisory control of the robot or the data processor 14. For example, the user interface 36 may support activation or control of pan, tilt and zoom features of a camera or imaging device (as the sensor 26).

Having described the preferred embodiment, it will become apparent that various modifications can be made without departing from the scope of the invention as defined in the accompanying claims.

The following is claimed:

1. A method for operating a mobile robot, the method comprising:

collecting range data of one or more objects in an environment around the robot;
identifying uniquely identifiable ones of the objects as navigation landmarks;
storing a reference map of the navigation landmarks based on the collected range data;
establishing a list or sequence of way points for the robot to visit, each way point defined with reference to one or more landmarks;
reading a message on a tag posted at or near one or more way points; and
managing a task based on the read message.

2. The method according to claim 1 further comprising:
selecting the message on the tag from a library of messages or tags for a corresponding way point to control a corresponding task for execution at the corresponding way point or a later way point.

3. The method according to claim 1 further comprising:
changing the message on the tag to change one or more corresponding tasks to be managed.

4. The method according to claim 1 further comprising:
adding an additional later way point to the sequence of way points via a message at or near an earlier way point.

5. The method according to claim 1 further comprising:
deleting a later way point from the sequence of way points via a message at or near an earlier way point.

6. The method according to claim 1 further comprising:
detecting a safety event or an intrusion event;
interrupting the performance of a task or navigation to the next way point to generate an alarm transmission.

7. The method according to claim 6 further comprising:
transmitting the generated alarm via a wireless communications network to a communications device.

8. The method according to claim 6 further comprising:
detecting thermal variation associated with an open door or open window as the intrusion event.

9. The method according to claim 1 wherein the tag comprises a tag selected from the group consisting of an optical tag, a radio frequency tag, a radio frequency identifier, an RFID, a bar code, a uniform product code, an image on a display, a pattern on a display, and a message on a display.

10. A system for operating a mobile robot, the system comprising:
a range finder for collecting range data of one or more objects in an environment around the robot;
a discriminator for identifying uniquely identifiable ones of the objects as navigation landmarks;
a data storage device for storing a reference map of the navigation landmarks based on the collected range data;
a data processor for establishing a list or sequence of way points for the robot to visit, each way point defined with reference to one or more of the navigation landmarks;
a reader for reading a message on a tag posted at or near one or more way points; and
a task manager for managing a task based on the read optical message.

11. The system according to claim 10 further comprising:
a selector for selecting the message on the tag from a library of messages or tags for a corresponding way point to control a corresponding task for execution at the corresponding way point or a later way point.

12. The system according to claim 10 further comprising:
the data processor arranged to add an additional later way point to the established sequence of way points via a message received at an earlier way point.

13. The system according to claim 10 further comprising:
the data processor arranged to delete a later way point from the established sequence of way points via a message received at an earlier way point.

14. The system according to claim 10 further comprising:
a detector for detecting a security event or an intrusion event;
a task manager for interrupting the performance of a task or navigation to the next way point to generate an alarm transmission based the intrusion event or the security event.

15. The system according to claim 14 further comprising:
a mobile wireless communications device for transmitting the generated alarm transmission via a wireless communications network to a station wireless communications device.

16. The system according to claim 14 further comprising:
a thermal sensor for detecting thermal variation associated with an open door or window as the intrusion event.

17. The system according to claim 10 wherein the tag comprises a tag selected from the group consisting of an optical tag, a radio frequency tag, a radio frequency identifier, an RFID, a bar code, a uniform product code, an image on a display, a pattern on a display, and a message on a display.

* * * * *